July 3, 1962            A. MAGG            3,042,459
RETAINER FOR BALL BEARINGS
Filed July 31, 1961            2 Sheets-Sheet 1
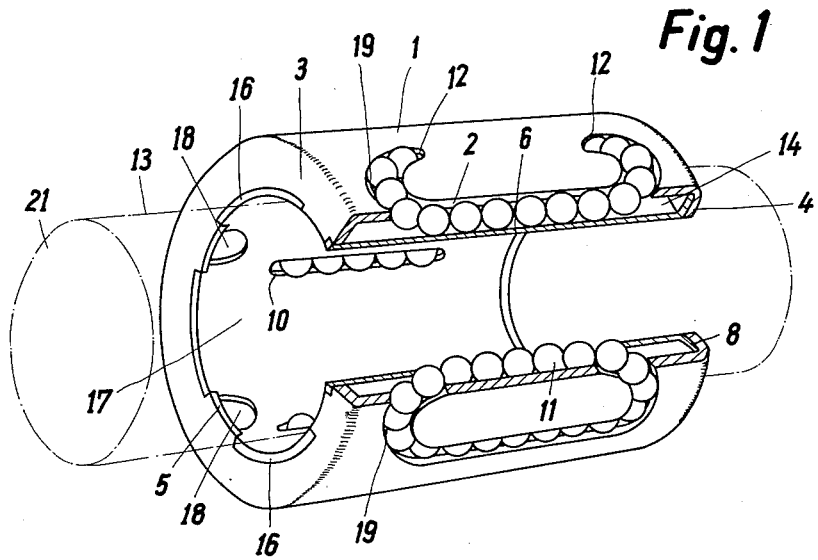
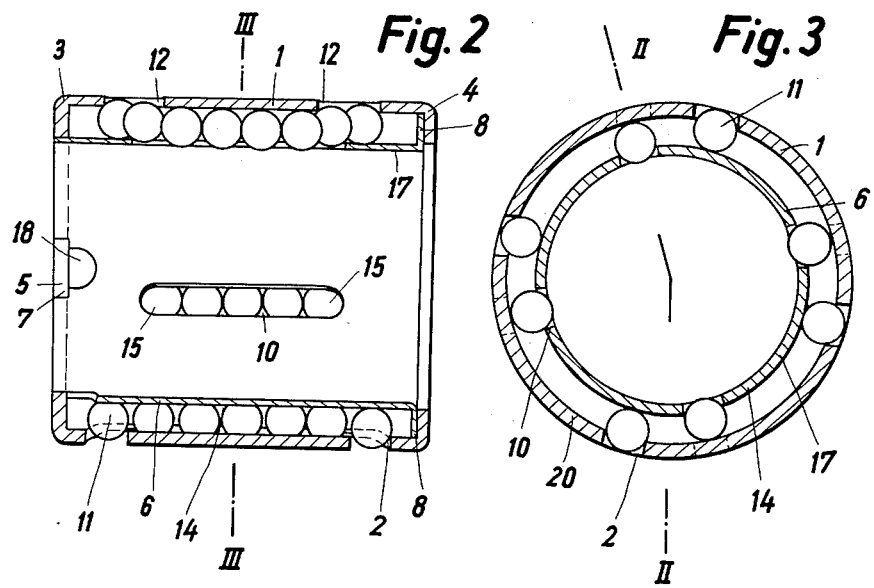
Inventor:

July 3, 1962 A. MAGG 3,042,459
RETAINER FOR BALL BEARINGS
Filed July 31, 1961 2 Sheets-Sheet 2
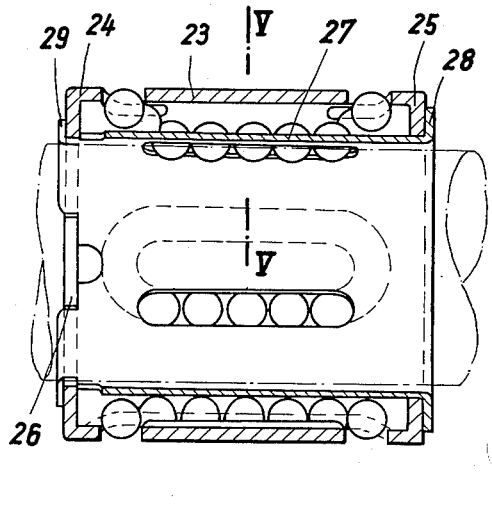
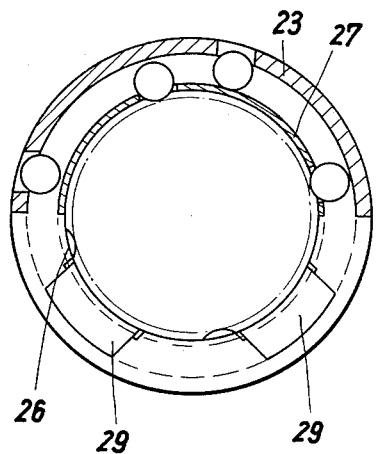
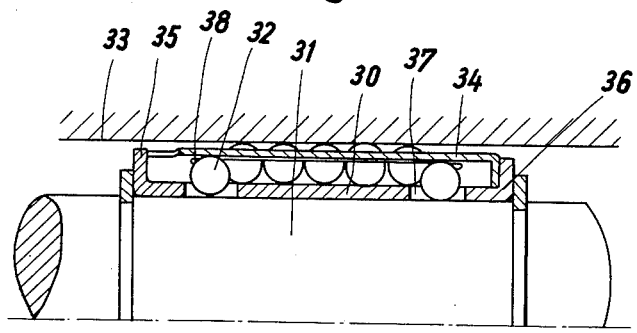

United States Patent Office 3,042,459
Patented July 3, 1962

3,042,459
RETAINER FOR BALL BEARINGS
Alfred Magg, Friedrichshafen, Germany, assignor to Zahnradfabrik Friedrichshafen, Aktiengesellschaft, Friedrichshafen am Bodensee, Germany
Filed July 31, 1961, Ser. No. 128,263
Claims priority, application Germany Aug. 13, 1960
10 Claims. (Cl. 308—6)

This invention relates to ball bearings of the type used for linear or straight-line movement of shafts, and more particularly to the assemblies of such bearings.

The prior art of so-called linear bearings is already well developed and contains many examples of bearings comprised of concentric sleeves which are provided with raceways coacting vis-a-vis to effect circulation of an isolated system of balls as the bearing reciprocates relative a shaft, or vice versa. Generally, each system, or loop of balls, is isolated from the others and acts independently of the others. Such systems or loops are spaced angularly about the periphery of the shaft and retained in a suitable retainer.

The prior art constructions have a number of disadvantages in that expensive parts of special shape and machining or stamping are required. Also, assembly is difficult and filling of each of the ball loops or systems with balls presents a complex operation. Moreover, such constructions are subject to a high degree of wear. Many examples of known constructions having the generally described drawbacks can be given or, for that matter, many examples can be given of known constructions which contain many other type of drawbacks too numerous to mention.

The present invention seeks to solve the problem of complexity, rapid wear, expense, etc. by providing a simple, easily manufactured, relatively cheap, long-wearing arrangement which will be evident as the disclosure unfolds.

Accordingly, the primary objects of the invention are to overcome the drawbacks of prior art construction, in accordance with the general discussion above, and to teach the manufacture of a linear bearing which may be made of conventional components, suitably worked. Other objects and features of the invention will be apparent from the description to follow.

Briefly, the invention comprises the assembly of a pair of sleeves or raceways to form a ball bearing container, which sleeves may be made of drawn, that is, seamless, commercial tubing of suitable strength. Fabrication of the raceways is exceedingly simple in that the sleeves are provided with coacting slots to form circulatory ball-loop systems by mere cutting through of the sleeves in predetermined places. Further, the sleeves may be readily provided with tongues and recesses, coacting with end flanges to form a completely integral device. The tooling for effecting such fabrication is simple and economical in nature as compared with the tooling for prior art constructions. Filling of the various ball systems is provided for by a simple notch associated with each of the loops or systems, such notch being cut through one of the sleeves and giving access to a ball-guiding slot of each system when the sleeves are in partially assembled condition.

Having thus generally described the invention, a detailed description now follows in conjunction with the appended drawing in which:

FIG. 1 is a perspective partially cut away to show details of an assembled retainer in accordance with the invention.
FIG. 2 is a section through II—II of FIG. 3.
FIG. 3 is a section through III—III of FIG. 2.
FIG. 4 is a longitudinal section through a modification of the invention.
FIG. 5 is an end view partly in section on the line V—V of FIG. 4; and
FIG. 6 is a view similar to FIG. 4 showing a still further modified form of the invention.

Referring to the first modification of the invention, as shown in FIGS. 1 through 3, a shaft 13, in phantom, will be seen to carry a retainer which comprises an outer sleeve 1 concentric around an inner sleeve 6. The outer sleeve is provided with a series of peripherally spaced, C-shaped cutouts 2 which are provided directly through the wall of the material of the sleeve. Such cutouts 2 coact with respective, longitudinal cutouts or slots 10 in the inner sleeve 6. Thus, each slot 10, acting in conjunction with a slot 2, forms a loop or system for circulation of a series of balls 11 which fill the composite path afforded by the two slots and can move continuously, that is, circulate, in either direction by passing either end 12 of slot 2 into either respective end 15 of slot 10 for each system. The circulatory ball motion is not new and has been exploited in many ways heretofore, as indicated in the preliminary discussion above. In the present instance, however, it will be noted that the sleeves are perfectly smooth, having no protuberances or special ridges or grooves, and affording continuous, smooth raceways between the inner surface of the outer sleeve and the outer surface of the inner sleeve. Thus, as seen on FIG. 3, the balls are under load when partially protruding through the slots 10 of the inner sleeve 6, so as to bear against the shaft (not shown in FIG. 3), being thus disposed between the inner surface 20 of the outer sleeve and the shaft. The other balls shown in FIG. 3 are, meanwhile, rolling on the smooth, outer surface 17 of the inner sleeve 6, being retained by virtue of the slots 2.

It is obvious that the width of the slots must be such as to retain the balls in their respective orbits or systems, and preferably the outer sleeve which carries ball load is thicker than the inner sleeve, as shown.

From the foregoing description it will be apparent that the raceways may be comprised of simple tubing slotted as explained and disclosed, and without any special machining, forming, or other operation insofar as the ball orbits are concerned.

The mode of maintaining the two sleeves in axially and radially locked relationships will now be described. Referring to FIGS. 1 and 3, it will be noted that the left-hand end of the outer sleeve 1 is provided with a continuous, radial, inturned flange 3. The edge of the flange 3 is provided with recesses 16 which are located intermediate the several ball loops. These are merely cut out arcuate slots which accommodate respective tongues formed of the edge of the inner sleeve, which tongues interdigitate in an obvious manner with the respective slots. In other words, the edge of the inner sleeve is castellated so as to effect projections engaging in recesses 16, the extreme end of the inner sleeve being flush with the outer surface of flange 3, and such tongues being locked against rotation by the projections 5 intermediate the recesses 16. Cut-out filler notches 18 are provided, axially aligned with the curved portions 19 of the slots 2, aligned with the aforementioned projections 5, which projections will be understood to interdigitate with recesses provided in the edge of inner sleeve 6. Thus, a completely interdigitated edge condition for the left-hand ends (as viewed in FIGS. 1 and 2) of the sleeve is provided and the filler notches 18 will be understood to extend out to the edge of the inner sleeve as is shown in FIGS. 1 and 2.

The left-hand end of the construction is supported in a rugged and simple manner by the outwardly disposed, radial flange 8 on the inner sleeve, which flange has an edge bearing against the interior surface of the outer sleeve.

For purpose of assembly, the inner sleeve is partially thrust into the outer sleeve, from the right as viewed on FIG. 2, to the point where the curved portions 19 are radially aligned with respective filler cutouts 18. The balls 11 are then inserted into each of the systems so as to fill each loop, the inner sleeve is then thrust home within the outer sleeve, interdigitation of the various tongues and recesses at the left end then taking place. Finally, the radial flange 4 of the outer sleeve is formed at this time, being forced downwardly to lock against flange 8 whereby the entire assembly is thus axially locked and keyed together.

The operation of the assembly, when mounted on a shaft, will be apparent and it will be understood that the tapered ends 15 of the slots 10 facilitate the riding up of the balls between the raceway surfaces as they circulate with reciprocation of the device, or relative reciprocation between the shaft and the device. It will also be apparent that the general dimensions of the flanges, tongues, grooves, and slots are such as to provide a cleanly finished object and one with no projections extending outwardly of any surface. The clearance between the raceway surfaces 17 and 20 will, of course, be understood to suitably conform with the diameter of the balls taking into account the extent of protruding of the balls desired radially inwardly when under load against the shaft. Such matters are, of course, governed by size, type, and design, and will be clearly understood by engineers working in this field. However, it is pointed out that the clearances between the raceways should be such that the balls may be continued in circulation back into the C-shaped slots 2 free of load.

The form of the invention as shown in FIGS. 4 and 5 is quite similar to the form shown in FIGS. 1, 2, and 3, except for the flange arrangement for locking the two sleeves together. In this case, the sleeves 23 and 27 are maintained in concentric arrangement by virtue of inwardly turned, radial flanges 24 and 25 of sleeve 23, which bear against the outer surface at the ends of inner sleeve 27. The flange 24 is provided with tongues 26 which fit edge notches or recesses, by interdigitation thereof, effected by the spacing of lugs 29 angularly disposed about the end of the inner sleeve. Thus, assembly is in the same mode as heretofore described for the form of the invention of FIGS. 1, 2, and 3, except that, in this instance, after the inner sleeve has been thrust home, the outwardly disposed, radial flange 28 thereof abuts flange 25 of the outer sleeve and the lugs 29 at this time point axially and pass between the tongues 26 and are then bent outwardly to form radial, interlocking members as shown.

The form of the invention shown in FIG. 6 is substantially a reversal of parts of the form shown in FIGS. 1 through 3. In this case, however, the external load-carrying surface is provided by the surface 33 of a bore in which the shaft 31 will be understood to reciprocate so that the balls 32 carry load between heavier, or inner sleeve 30, and surface 33. The orbital, or circulatory movement of the balls is the same as heretofore described, alternately moving between slots 38 in outer sleeve 34 and 37 in the inner sleeve. The sleeves are assembled in precisely the same manner as described in conjunction with FIGS. 1 through 3, and it will be noted that the heavier, or inner, sleeve, in this case, is provided with the flanges 35 and 36, disposed radially outwardly, however, for retaining the sleeve 34. The entire retainer assembly may be mounted on a shaft, as shown, and locked in place thereon by split washers, as indicated in FIG. 6.

Having thus described the invention, I am aware that various changes may be made without departing from the spirit thereof and, accordingly, I do not seek to be limited to the precise illustration herein given except as set forth in the following claims.

I claim:

1. A linear movement bearing comprising a pair of concentric sleeves having respective, coacting slots for effecting circulation of balls therebetween as said bearing is moved axially on a shaft, each of said sleeves having an integral radial flange means at the same end thereof, the flange on one of said sleeves effecting concentric support of the other of said sleeves at that end, the other end of one of said sleeves having a radial flange means interlockingly engaged with the corresponding end of the other of said sleeves and maintaining said latter end of said sleeves in keyed and concentric relation.

2. A bearing as set forth in claim 1, the flange means at said same ends extending radially inwardly of one of said sleeves and the flange means on the other of said sleeves extending radially outwardly, said flange means being contiguous.

3. A linear movement bearing comprising a pair of concentric sleeves having respective, coacting slots for effecting circulation of balls therebetween as said bearing is moved axially on a shaft, said sleeves being formed of sheet metal and each of said sleeves having an integral radial flange at the same end thereof, the flange on the inner of said sleeves effecting concentric support thereof within the outer of said sleeves at that end, the other end of one of said sleeves having a radial flange interlockingly engaged with the corresponding end of the other of said sleeves and maintaining said latter end of said sleeves in concentric relation.

4. A linear movement bearing comprising a pair of spaced ball cylindrical races having concentric surfaces, one of said races having a C-shaped slot extending in a predetermined direction, the other of said races having a substantially straight slot disposed to coact with said C-shaped slot to effect ball circulation between said races, said slots being cut directly through the uniform surfaces of respective races.

5. A bearing as set forth in claim 4, one of said races having a filler notch adjacent one edge whereby said slots may be filled with balls in an intermediate assembly position of said races.

6. A linear movement bearing comprising a pair of concentric sleeves having respective, coacting slots for effecting circulation of balls therebetween as said bearing is moved axially on a shaft, said sleeves being formed of sheet metal and each of said sleeves having an integral radial flange at the same end thereof, the flange on one of said sleeves effecting concentric support of the other of said sleeves at that end, the other end of one of said sleeves having a radial flange provided with recesses in its annular edge, the corresponding end of the other of said sleeves having its edge provided with tongues engaged in respective recesses for maintaining said latter end of said sleeves in concentric relation and locked against relative rotation.

7. A bearing as set forth in claim 6, one of the flanges at said same end being formed in radial contiguity with the other of said flanges to maintain said sleeves in axially locked condition in conjunction with the engagement of said tongues and recesses.

8. A linear movement bearing comprising an assembly of concentric sleeves having respective, coacting slots for effecting circulation of balls therebetween as said bearing is moved axially on a shaft, each sleeve being formed of sheet metal of uniform thickness and each of said sleeves being smoothly circular, said slots comprising cutouts through the wall material of respective sleeves, each slot on each sleeve coacting with a respective slot on the other sleeve to form a circulatory system for a predetermined number of balls, said systems being isolated from each other and distributed about the periphery of said sleeves, a filler notch for each system aligned with a cutout slot of said system to introduce balls into said system when said sleeves are in partially assembled condition with respect to each other, said notches being cut through the wall material of one of said sleeves at an edge thereof.

9. A linear movement bearing comprising a pair of concentric sleeves having respective, coacting slots cut therethrough for effecting circulation of balls therebetween as said bearing is moved relative to a supporting surface, said sleeves being formed of sheet metal and each of said sleeves having interlocking means at the ends thereof effecting concentric support of one of said sleeves on the other of said sleeves, the slots of one of said sleeves being substantially C-shaped and the coacting slots of the other sleeve being substantially straight and in line with the ends of respective C-shaped slots.

10. A bearing as set forth in claim 9, said interlocking means comprising angularly spaced radial flanges on one sleeve disposed in edge recesses of the other sleeve.

References Cited in the file of this patent

UNITED STATES PATENTS

| | | |
|---|---|---|
| 2,628,135 | Magee | Feb. 10, 1953 |
| 2,724,625 | White | Nov. 22, 1955 |